(No Model.)

F. E. WOLFF & G. FINFROCK.
ROLLING PIN.

No. 534,460. Patented Feb. 19, 1895.

Witnesses:

Frank E. Wolff &
George Finfrock.
Inventors

By Edson Bros.
Attorneys

UNITED STATES PATENT OFFICE.

FRANK E. WOLFF AND GEORGE FINFROCK, OF CHICAGO, ILLINOIS.

ROLLING-PIN.

SPECIFICATION forming part of Letters Patent No. 534,460, dated February 19, 1895.

Application filed May 8, 1894. Serial No. 510,530. (No model.)

*To all whom it may concern:*

Be it known that we, FRANK E. WOLFF and GEORGE FINFROCK, citizens of the United States, residing at Chicago, in the county of Cook and State of Illinois, have invented certain new and useful Improvements in Rolling-Pins; and we do hereby declare the following to be a full, clear, and exact description of the invention, such as will enable others skilled in the art to which it appertains to make and use the same.

Our invention relates to improvements in rolling pins, and the object in view is to provide a simple and inexpensive construction by which a sheet of dough can be rolled to uniform thickness.

A further object of the invention is to provide means whereby the roller is adapted to roll out sheets of dough which may differ in thickness to meet the requirements of the user.

With these ends in view, the first part of the invention consists of a rolling pin having spacing collars at opposite ends of its cylindrical body and spindles extending beyond the said collars and provided at their outer extremities with threaded tenons, gage wheels fitted loosely on the spindles, to bear against the spacing collars and made of greater diameter than the cylindrical body, thimbles fitted loosely on the spindles to bear against the gage wheels and serving as the handles for the manipulation of the rolling pin, and nuts fitted on the threaded tenons to hold the thimbles in place.

In one embodiment of our invention we may make the gage wheels integral with the cylindrical body and separated therefrom by reduced portions which are equivalent to the spacing collars, and these gage wheels are grooved circumferentially to receive the tires which are employed to elevate the cylindrical body of the rolling pin the desired distance above the rolling board to gage the thickness of the sheet of dough to be rolled uniformly by the pin. In this embodiment of our invention the tires are made of different diameters and adapted to be expanded when fitted in the grooves of the gage wheels, the different sizes of tires being thus interchangeable to enable the pin to roll sheets of dough varying in thickness.

The invention further consists in the peculiar construction and combination of parts which will be hereinafter more fully described and pointed out in the claims.

We have illustrated different embodiments of our invention in the accompanying drawings, forming a part of this specification, and in which—

Figure 1:
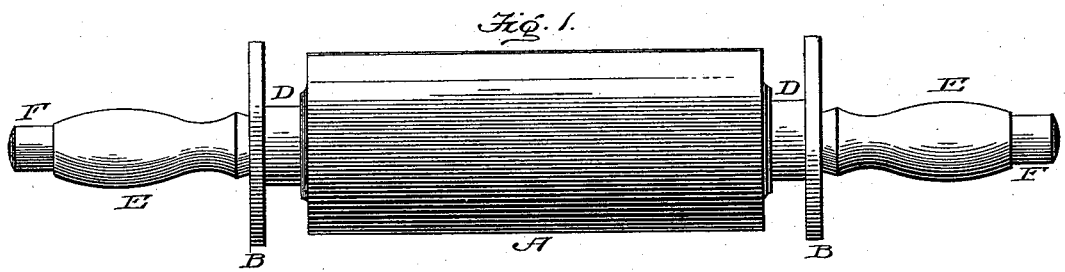
Figure 2:
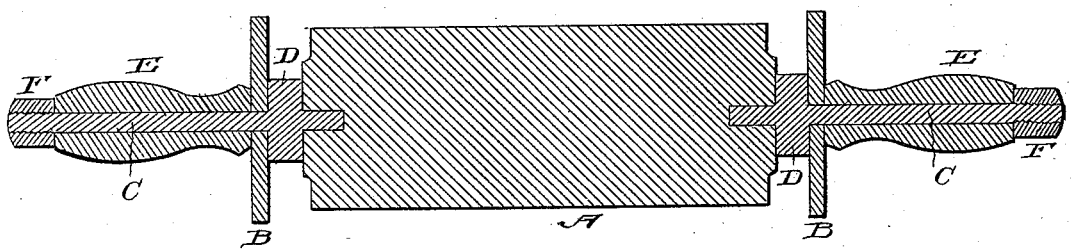
Figure 3:
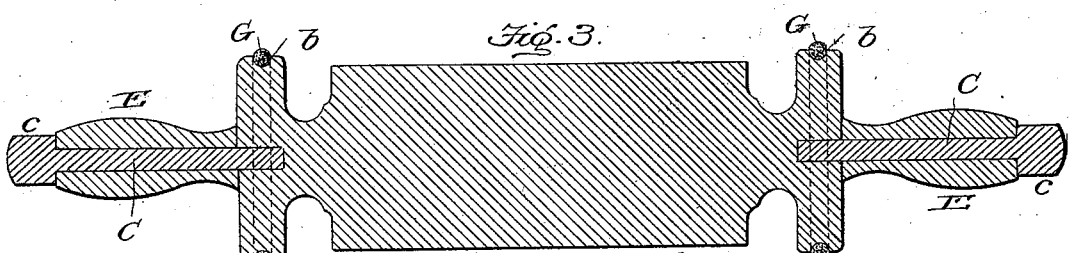
Figure 4:
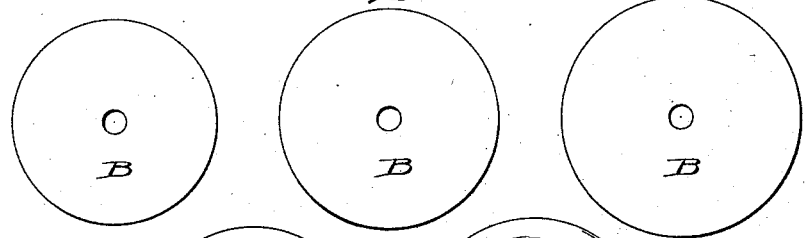
Figure 5:
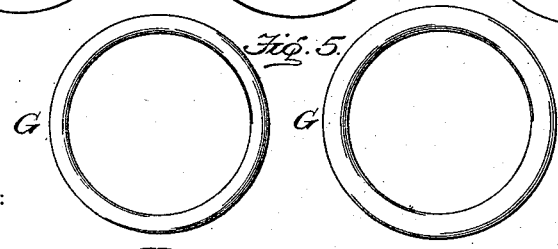
Figure 6:
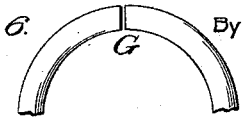

Figure 1 is a plan view, and Fig. 2 is a longitudinal section of a construction in which we use removable gage wheels adapted to be interchanged with other gage wheels of different diameters. Fig. 3 is a longitudinal sectional view through another embodiment of our rolling pin in which the gage wheels are made rigid with the cylindrical body and removable tires are employed. Figs. 4, 5 and 6 are detail views of metallic and elastic tires adapted for use in connection with the gage wheels of the pin shown by Fig. 3.

Like letters of reference denote like parts in all the figures of the drawings, referring to which—

A denotes the cylindrical body of the rolling pin; B B, the gage wheels; C, C, the spindles, and E, E, the thimbles.

In the embodiment of our invention shown by Figs. 1 and 2, the cylindrical body A is made in a single piece with the axial spindles C, C, and with the spacing collars D, D, the collars being of less diameter than the cylindrical body A and situated at the ends thereof, to space the gage wheels B, B, a suitable distance from the ends of the cylindrical body, whereby the gage wheels are adapted to travel on the rolling board without contact with the sheet of dough as it is rolled out by the cylindrical body A and the wheels are kept free from being clogged by the dough.

The gage wheels B, B, are fitted loosely on the spindles C, C, and arranged to have one side thereof bear against the spacing collars D, D. The thimbles E, E, are shaped to form the handles for operating the rolling pin, and these thimbles are fitted loosely on the spindles, C, C, so that the inner ends thereof bear against the outer sides of the gage wheels B, B. These thimbles are held in place by the nuts F which are screwed on the threaded tenons at the ends of the spindles, and thus the thimbles and gage wheels are held against movement endwise on the spindle and at the same time said thimbles and gage wheels are free to rotate on said spindles.

It is evident that the nuts F and thimbles E can be readily detached from the spindles to permit the gage wheels B to be taken off the spindles; and by this construction we are able to employ gage wheels of different diameters which are thus made interchangeable to adapt the rolling pin to uniformly roll out sheets of dough of different thicknesses as may be desired.

The thimbles and nuts can be easily replaced after the set of gage wheels, of proper diameter, is fitted on the spindles of the rolling pin.

Although we have described the cylindrical body as being integral with the spacing collars and spindles, we do not wish to be understood as limiting ourselves to this exact construction, because the spindles and spacing collars may be made in separate pieces from the cylindrical body and the inner ends of the spindles fitted in and rigidly secured to the ends of the cylindrical body as shown by Fig. 2, of the drawings.

In the embodiment of our invention shown by Figs. 3 and 5, we show the body A and wheels B as made in a single piece and joined together by the reduced necks which are the equivalents of the collars D, D, inasmuch as said necks serve to space the gage wheels B, B, from the ends of the body A. The spindles C, are suitably secured in the gage wheels and on these spindles are fitted the thimbles E which are held from endwise movement by the wheels B and the enlarged heads c at the outer extremities of the spindles. See Fig. 3. The wheels B in this construction are grooved circumferentially, as at b, and in these grooves are fitted tires G. These tires are made of suitable material to permit them to be expanded and to contract by their inherent elasticity, and these tires are made in different sizes, the internal diameter of all the tires being substantially the same and equal to the diameter of the grooves b in the gage wheels. We may make these tires of steel or other elastic metal, and the elastic metallic tire is split or divided transversely to enable it to be expanded and easily fitted in the groove of the gage wheel, after which the elasticity of the tire causes it to contract and closely hug the gage wheel. In lieu of the metallic tire, we may make the tire of rubber or other similar elastic material which can be expanded, by hand, to fit the same in the groove b and will contract, by its inherent elasticity, to snugly fit in the groove of the wheel. By using a set of tires whose external diameter varies, we are able to regulate the distance of the cylindrical body A above the rolling board and adapt the pin to uniformly roll sheets of dough of varying thicknesses.

The operation and advantages of our invention will be readily understood and appreciated by those skilled in the art from the foregoing description taken in connection with the drawings.

We are aware that slight changes in the form and proportion of parts of the devices herein shown and described as an embodiment of our invention can be made by a skilled mechanic without departing from the spirit or sacrificing the advantages thereof, and we therefore reserve the right to make such alterations as fairly fall within the scope of our invention.

Having thus fully described our invention, what we claim as new, and desire to secure by Letters Patent, is—

1. As an article of manufacture, a rolling pin consisting of a cylindrical body, the spindles in fixed relation to the body, the gage wheels spaced by intermediate devices from the ends of the body, and the loose thimbles on said spindles, substantially as and for the purposes described.

2. The combination with a cylindrical body and fixed spindles, of the gage wheels fitted loosely on the spindles, the spacing blocks between the gage wheels and the body, and the loose thimbles on the spindles, substantially as described.

3. The combination with the cylindrical body of a rolling pin, and the spindles extending beyond the ends of said body, of sets of interchangeable gage wheels adapted to be applied in pairs on the spindles, and spacing collars which separate said gage wheels from the ends of the cylindrical body, substantially as and for the purposes described.

4. The combination with the cylindrical body of a rolling pin, and spindles extending beyond said body, of gage wheels on said spindles, spacing collars which separate the gage wheels from the ends of the body, and thimbles fitted on the spindles to bear against the gage wheels, substantially as described.

In testimony whereof we affix our signatures in presence of two witnesses.

FRANK E. WOLFF.
GEORGE FINFROCK.

Witnesses:
WM. DUFFY,
H. F. BERNHARD.